(12) United States Patent
Nose et al.

(10) Patent No.: US 12,042,935 B2
(45) Date of Patent: Jul. 23, 2024

(54) LINK ACTUATION APPARATUS

(71) Applicant: NTN CORPORATION, Osaka (JP)

(72) Inventors: Kenzou Nose, Iwata (JP); Hiroshi Isobe, Iwata (JP)

(73) Assignee: NTN CORPORATION, Osaka (JP)

( * ) Notice: Subject to any disclaimer, the term of this patent is extended or adjusted under 35 U.S.C. 154(b) by 596 days.

(21) Appl. No.: 17/204,241

(22) Filed: Mar. 17, 2021

(65) Prior Publication Data

US 2021/0197362 A1 Jul. 1, 2021

Related U.S. Application Data

(63) Continuation of application No. PCT/JP2019/037372, filed on Sep. 24, 2019.

(30) Foreign Application Priority Data

Sep. 28, 2018 (JP) ................. 2018-183107

(51) Int. Cl.
| | | |
|---|---|---|
| *B25J 9/00* | (2006.01) | |
| *B25J 17/02* | (2006.01) | |
| *F16H 21/46* | (2006.01) | |

(52) U.S. Cl.
CPC ......... *B25J 9/0048* (2013.01); *B25J 17/0266* (2013.01); *F16H 21/46* (2013.01)

(58) Field of Classification Search
CPC .............. B25J 9/0048; B25J 17/0266; B25J 9/1623; B25J 9/1674; F16H 21/46; G05B 23/0235; G05B 19/0426; F16C 41/00
See application file for complete search history.

(56) References Cited

U.S. PATENT DOCUMENTS

| | | |
|---|---|---|
| 5,893,296 A | 4/1999 | Rosheim |
| 7,706,922 B2 | 4/2010 | Ueno et al. |

(Continued)

FOREIGN PATENT DOCUMENTS

| | | |
|---|---|---|
| CN | 101027961 A | 9/2007 |
| CN | 101180163 A | 5/2008 |

(Continued)

OTHER PUBLICATIONS

International Preliminary Report on Patentability dated Apr. 8, 2021, in corresponding International Patent Application No. PCT/JP2019/037372.

(Continued)

*Primary Examiner* — Darrin D Dunn

(57) ABSTRACT

A link actuation apparatus includes: a parallel link mechanism including a proximal-side link hub, a distal-side link hub, and three or more link mechanisms each coupling the distal-side link hub to the proximal-side link hub such that a posture of the distal-side link hub can be changed relative to the proximal-side link hub; posture control drive sources; and a control device. The control device includes an abnormality detector including: a measurement section configured to measure a predetermined state value which is affected by abnormality in revolute pair parts of a link actuation apparatus body constituted by the parallel link mechanism and the posture control drive sources; and a determination section configured to determine if any of the revolute pair parts has abnormality in on the basis of a measurement result obtained by the measurement section. For example, the measurement section measures rigidity, or driving torque or the like.

5 Claims, 11 Drawing Sheets

(56) References Cited

U.S. PATENT DOCUMENTS

| | | |
|---|---|---|
| 8,307,732 B2 | 11/2012 | Kinoshita et al. |
| 8,650,965 B2 | 2/2014 | Hashiguchi et al. |
| 8,806,974 B2 | 8/2014 | Helmer et al. |
| 8,948,915 B2 | 2/2015 | Nakanishi |
| 9,394,979 B2 | 7/2016 | Yamada et al. |
| 9,522,469 B2 | 12/2016 | Isobe et al. |
| 10,179,408 B2 | 1/2019 | Lee |
| 10,259,115 B2 | 4/2019 | Takano et al. |
| 10,350,753 B2 | 7/2019 | Abe et al. |
| 10,513,028 B2 | 12/2019 | Isobe et al. |
| 10,754,305 B2 | 8/2020 | Iwase |
| 10,828,779 B2 | 11/2020 | Marui et al. |
| 2008/0039973 A1 | 2/2008 | Ueno et al. |
| 2008/0140258 A1 | 6/2008 | Ueno et al. |
| 2008/0223165 A1 | 9/2008 | Helmer et al. |
| 2008/0287850 A1 | 11/2008 | Adarraga |
| 2011/0097184 A1 | 4/2011 | Kinoshita et al. |
| 2012/0048027 A1 | 3/2012 | Hashiguchi et al. |
| 2013/0060381 A1 | 3/2013 | Nakanishi |
| 2014/0223722 A1* | 8/2014 | Isobe ............... B23P 19/04 29/700 |
| 2014/0305244 A1 | 10/2014 | Yamada et al. |
| 2015/0088308 A1 | 3/2015 | Isobe et al. |
| 2017/0157778 A1 | 6/2017 | Lee |
| 2017/0173792 A1 | 6/2017 | Takano et al. |
| 2017/0348855 A1 | 12/2017 | Abe et al. |
| 2018/0194002 A1 | 7/2018 | Isobe et al. |
| 2018/0207800 A1 | 7/2018 | Marui et al. |
| 2019/0384233 A1 | 12/2019 | Iwase |

FOREIGN PATENT DOCUMENTS

| | | |
|---|---|---|
| CN | 102049776 A | 5/2011 |
| CN | 102431033 A | 5/2012 |
| CN | 105105970 A | 12/2015 |
| CN | 106808464 A | 6/2017 |
| CN | 106891321 A | 6/2017 |
| CN | 107457798 A | 12/2017 |
| CN | 107949459 A | 4/2018 |
| CN | 108136587 A | 6/2018 |
| EP | 0987087 A | 3/2000 |
| EP | 2567795 A2 | 3/2013 |
| JP | 2000-94245 A | 4/2000 |
| JP | 2005-40919 | 2/2005 |
| JP | 2006-281421 A | 10/2006 |
| JP | 2007-320495 | 12/2007 |
| JP | 2008-40930 A | 2/2008 |
| JP | 4476603 B | 3/2010 |
| JP | 2013-52501 A | 3/2013 |
| JP | 2013-198942 A | 10/2013 |
| JP | 5785055 B | 7/2015 |
| WO | WO 2016/129623 A1 | 8/2016 |
| WO | 2017/051866 A1 | 3/2017 |
| WO | 2018/029910 A1 | 2/2018 |

OTHER PUBLICATIONS

Notice of Reasons for Refusal issued May 10, 2022 in Japanese Patent Application No. 2018-183107.

Extended and Supplementary Search Report issued Jun. 7, 2022 in European Patent Application No. 19867647.0.

Japanese Office Action dated Nov. 22, 2022, in Japanese Patent Application No. 2018-183107 (6 pages; 6 pages English translation).

International Search Report dated Dec. 3, 2019 in International Patent Application No. PCT/JP2019/037372.

* cited by examiner

LINK ACTUATION APPARATUS

CROSS REFERENCE TO THE RELATED APPLICATION

This application is a continuation application, under 35 U.S.C. § 111(a) of international patent application No. PCT/JP2019/037372, filed Sep. 24, 2019, which claims priority to Japanese patent application No. 2018-183107, filed Sep. 28, 2018, the entire disclosures of all of which are herein incorporated by reference as a part of this application.

BACKGROUND OF THE INVENTION

Field of the Invention

The present invention relates to a link actuation apparatus for equipment that requires a precise and wide operation range such as medical equipment and industrial equipment and, in particular, to a technology for determining abnormality in a revolute pair part of the apparatus.

Description of Related Art

For example, Patent Documents 1 to 4 disclose link actuation apparatuses that have a compact configuration and are capable of operating in a precise and wide operating range. The link actuation apparatus of Patent Document 1 includes: a parallel link mechanism in which a distal-side link hub is coupled to a proximal-side link hub through three or more link mechanisms such that a posture of the distal-side link hub can be changed relative to the proximal-side link hub; and posture control drive sources provided to two or more of the three or more link mechanisms and configured to arbitrarily change the posture of the distal-side link hub relative to the proximal-side link hub.

RELATED DOCUMENT

Patent Document

[Patent Document 1] JP Laid-open Patent Publication No. 2000-094245
[Patent Document 2] U.S. Pat. No. 5,893,296
[Patent Document 3] JP Patent No. 4476603
[Patent Document 4] JP Patent No. 5785055

In a link actuation apparatus having the above constitution, the positioning accuracy and/or rigidity of the apparatus can be improved by inserting shims between bearings disposed in respective revolute pair parts to apply a preload during assembly so as to reduce backlash in the revolute pair parts. The positioning accuracy and/or rigidity of the apparatus can also be improved by improving the rigidity of the revolute pair parts by the arrangement of the bearings (such as back-to-back (DB), face-to-face (DF)). However, desired positioning accuracy and/or rigidity may not be achieved in cases where the shims are left uninserted or are inserted in an overlapping manner during assembly of such revolute pair parts or in cases where the bearings are arranged improperly. In some cases, it is difficult to detect deterioration of the positioning accuracy and/or rigidity due to wear resulting from prolonged operation at an early stage.

In a parallel link mechanism having the constitution of Patent Document 3, it is difficult to detect deterioration of the rigidity and positioning accuracy due to improper assembly and/or wear resulting from prolonged continuous operation and identify the cause of the deterioration because a link part has varying rigidity depending on a posture of the distal member. Therefore, a parallel link mechanism having the above constitution is required to be capable of easily detecting abnormality in pre-shipment inspection and/or during continuous operation.

SUMMARY OF THE INVENTION

In order to solve the above problem, an object of the present invention is to provide a link actuation apparatus capable of easily detecting deterioration of the rigidity and positioning accuracy of the apparatus due to improper assembly of a link actuation apparatus body and/or prolonged operation, without disassembling the apparatus and even with its operation continuing.

A link actuation apparatus of the present invention will be described using reference signs used in the description of embodiments. The link actuation apparatus of the present invention includes:

a parallel link mechanism 10 including a proximal-side link hub 12, a distal-side link hub 13, link mechanisms 14 each coupling the distal-side link hub 13 to the proximal-side link hub 12 such that a posture of the distal-side link hub 13 can be changed relative to the proximal-side link hub 12, and revolute pair parts 31 to 34 which serve as connections in the link mechanisms 14;

posture control drive sources 11 (11-1 to 11-3) configured to arbitrarily change the posture of the distal-side link hub 13 relative to the link mechanisms 14; and a control device 2 configured to control the posture control drive sources 11, wherein the control device 2 includes an abnormality detector 4 including:

a measurement section 5 configured to measure a predetermined state value which is affected by abnormality in the revolute pair parts 31 to 34 of a link actuation apparatus body 1 constituted by the parallel link mechanism 10 and the posture control drive sources 11; and a determination section 6 configured to determine if the link actuation apparatus body 1 has abnormality in any of the revolute pair parts 31 to 34 on the basis of a measurement result obtained by the measurement section 5.

According to the link actuation apparatus having this constitution, the control device 2 includes an abnormality detector 4 including: a measurement section 5 configured to measure a certain state value of the link actuation apparatus body 1, which is affected by abnormality in the revolute pair parts 31 to 34; and a determination section 7 configured to determine if the link actuation apparatus body 1 has abnormality in any of the revolute pair parts 31 to 34 on the basis of a measurement result obtained by the measurement section 5. This makes it possible to easily detect deterioration of the rigidity and positioning accuracy of the apparatus due to improper assembly of the revolute pair parts 31 to 34 of the link actuation apparatus body 1, which are constituted by bearings 23 and peripheral components, and/or due to prolonged operation, without disassembling the apparatus and even with its operation continuing.

In the present invention, the measurement section 5 may be configured to measure rigidity of the link actuation apparatus body 1, and the determination section 6 may be configured to determine the abnormality according to a predetermined rule on the basis of a measurement value obtained by the measurement section 5. The "rigidity" of the link actuation apparatus body 1 represents difficulty in changing the posture of the link actuation apparatus body 1, and the rigidity of the link actuation apparatus body 1 results from overall difficulty in rotating the respective revolute pair parts 31 to 34 (i.e., rigidity of the respective revolute pair parts 31 to 34).

The rigidity of the link actuation apparatus body 1 is greatly affected by improper assembly of the bearings 23 of the revolute pair parts 31 to 34 or wear due to prolonged operation. For this reason, abnormality in the revolute pair parts 31 to 34 of the link actuation apparatus body 1 can be accurately detected by measuring the rigidity of the link actuation apparatus body 1 and determining the presence of abnormality according to the predetermined rule. The predetermined rule may be arbitrarily defined. For example, it is possible to compare a present measurement value to a reference value specified by design and/or a reference value based on a measurement value collected during normal time and then to determine that there is abnormality when the measurement value does not fall within a tolerable range with respect to the reference value. It is also possible to determine that the measurement value does not fall within a tolerable range when it exceeds a threshold that serves as a reference value. Alternatively, it is possible to perform the measurement and comparison multiple times so as to determine whether there is abnormality or not.

Where the rigidity is measured to determine if there is abnormality, the measurement section 5 may be configured to measure a natural frequency of the link actuation apparatus body 1 and estimate the rigidity on the basis of the natural frequency. The rigidity of the link actuation apparatus body 1 is related to its natural frequency, and the rigidity decreases as the natural frequency decreases. Accordingly, the measurement value of the natural frequency of the link actuation apparatus body 1 can be used to determine if there is abnormality in the link actuation apparatus body 1. Where the measurement value of the rigidity is used, the presence or absence of abnormality can be determined in an inspection by an operation test immediately after assembly and/or a measurement during operation, and therefore, it is possible to avoid supplying defective products which may cause malfunction or the like.

Where the rigidity is measured to determine if there is abnormality, the measurement section 5 may be configured to measure torque of the posture control drive sources 11 and estimate the rigidity of the link actuation apparatus body 1 on the basis of the measured torque. The rigidity of the revolute pair parts 31 to 34 (i.e., the difficulty in rotating them) is observed as torque of the posture control drive sources 11. Accordingly, the torque of the posture control drive sources 11 can be measured to estimate the rigidity of the link actuation apparatus body 1 on the basis of the measured torque. This makes it possible to detect improper assembly and simplify the inspection work. In addition, the presence or absence of abnormality can be determined in an inspection by an operation test immediately after assembly and/or a measurement during operation, and therefore, it is possible to avoid supplying defective products which may cause malfunction or the like.

In the present invention, the determination section 6 may include a storage section 7 configured to store state values of the link actuation apparatus body 1 in a plurality of postures, which are obtained when the respective revolute pair parts 31 to 34 of the link actuation apparatus body 1 are in a normal state, and the determination section 6 may be configured to compare a state value measured by the measurement section 5 to a value defined on the basis of the stored state values in the plurality of postures to determine the abnormality.

The presence or absence of abnormality can be appropriately determined by storing the state values obtained during normal time and comparing a present measurement value to the stored state values or to a value defined on the basis of the stored state values. Further, since the load acting on the revolute pair parts 31 to 34 greatly varies depending on the posture of the link actuation apparatus body 1, abnormality may not appear in a state value of the rigidity or the like of the bearings 23 of the revolute pair parts 31 to 34 depending on the posture. Accordingly, the determination of abnormality may be performed in a plurality of postures so as to accurately detect not only initial defects such as improper assembly, but also variation during prolonged use due to wear or the like. Moreover, it may also be possible to identify which of the revolute pair parts 31 to 34 has abnormality.

In the present invention, the control device 2 may include an abnormality determination motion command section 3c configured to drive the posture control drive sources 11 such that the link actuation apparatus body 1 assumes a predetermined posture for abnormality determination. In response to a command from the abnormality determination motion command section 3c, a motion for abnormality determination may be performed after assembly of the link actuation apparatus and/or before starting operation on each occasion, so as to surely and precisely detect not only initial defects such as improper assembly, but also variation during prolonged use due to wear or the like.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF THE EMBODIMENTS

An embodiment of the present invention will be described with reference to the drawings.

The link actuation apparatus includes: a link actuation apparatus body 1 constituted by a parallel link mechanism 10 and posture control drive sources 11 (11-1, 11-2, 11-3) for the parallel link mechanism; and a control device 2 configured to control the link actuation apparatus body 1.

Parallel Link Mechanism 10

Figure 3:
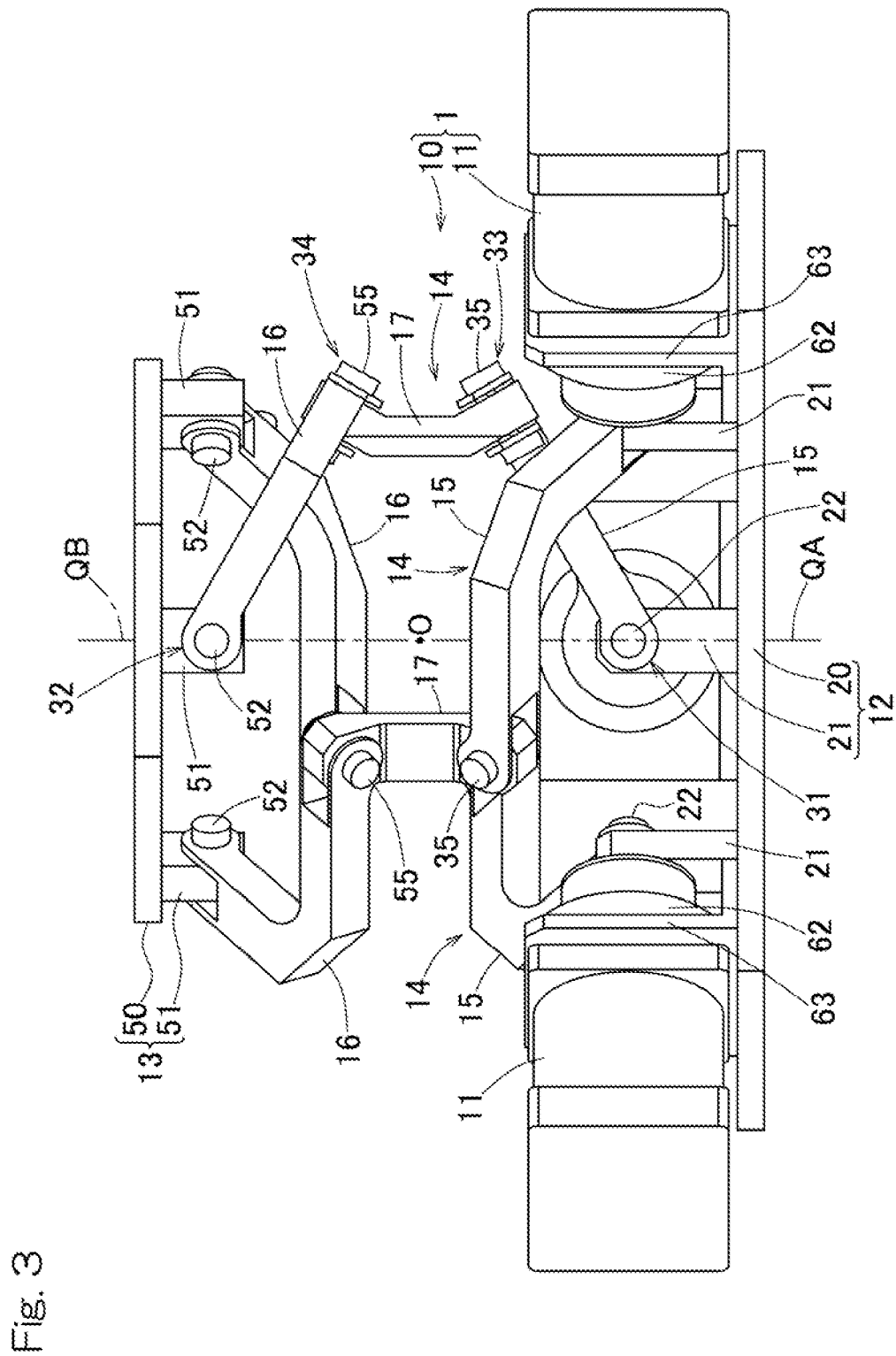
FIG. 3 is a front view of the link actuation apparatus body.
Figure 4:
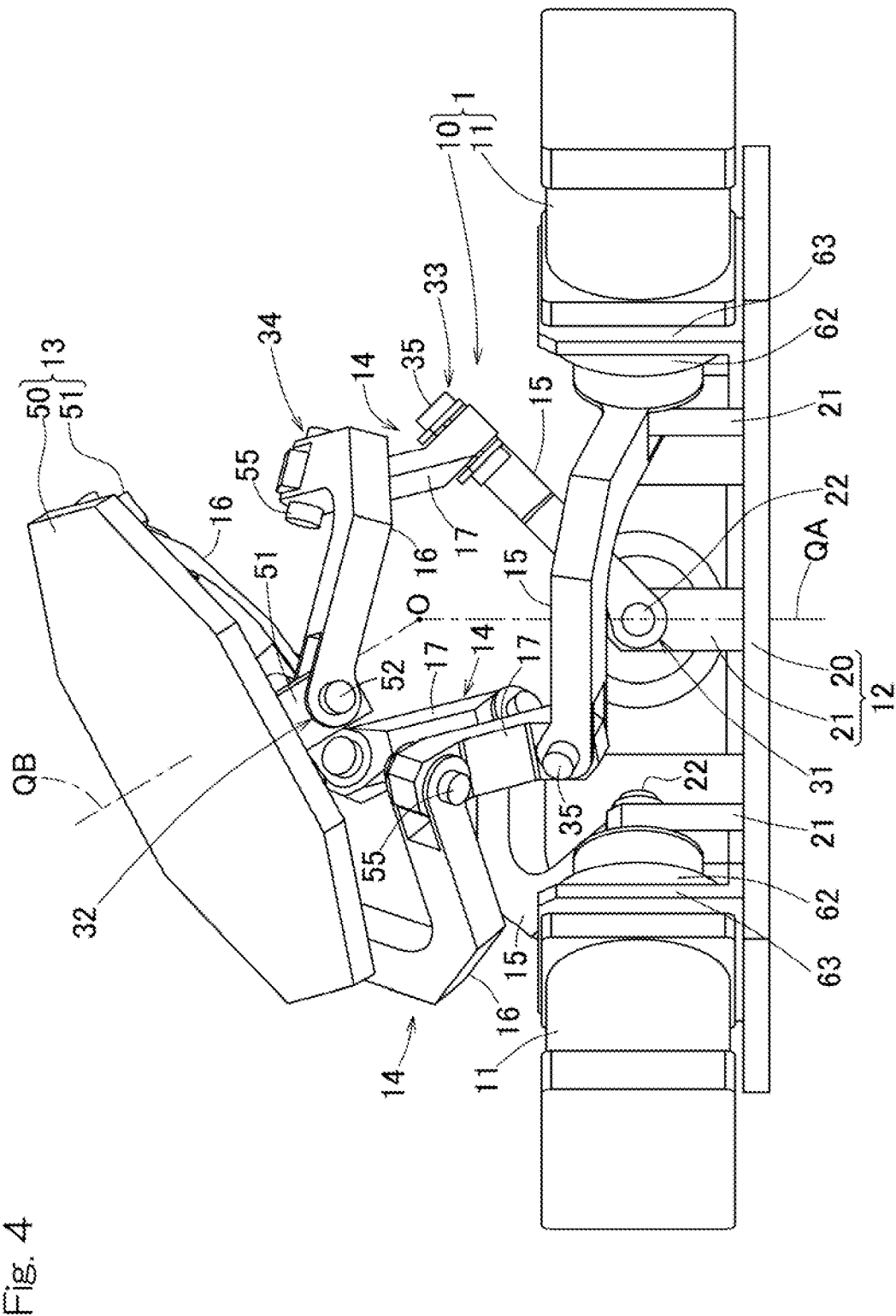
FIG. 4 is a front view of the link actuation apparatus body having a posture different from that of FIG. 3.

As shown in FIG. 3 and FIG. 4, the parallel link mechanism 10 couples a distal-side link hub 13 to a proximal-side link hub 12 through three link mechanisms 14 such that a posture of the distal-side link hub 13 can be changed relative to the proximal-side link hub 14. There may be four or more link mechanisms 14.

Figure 5:
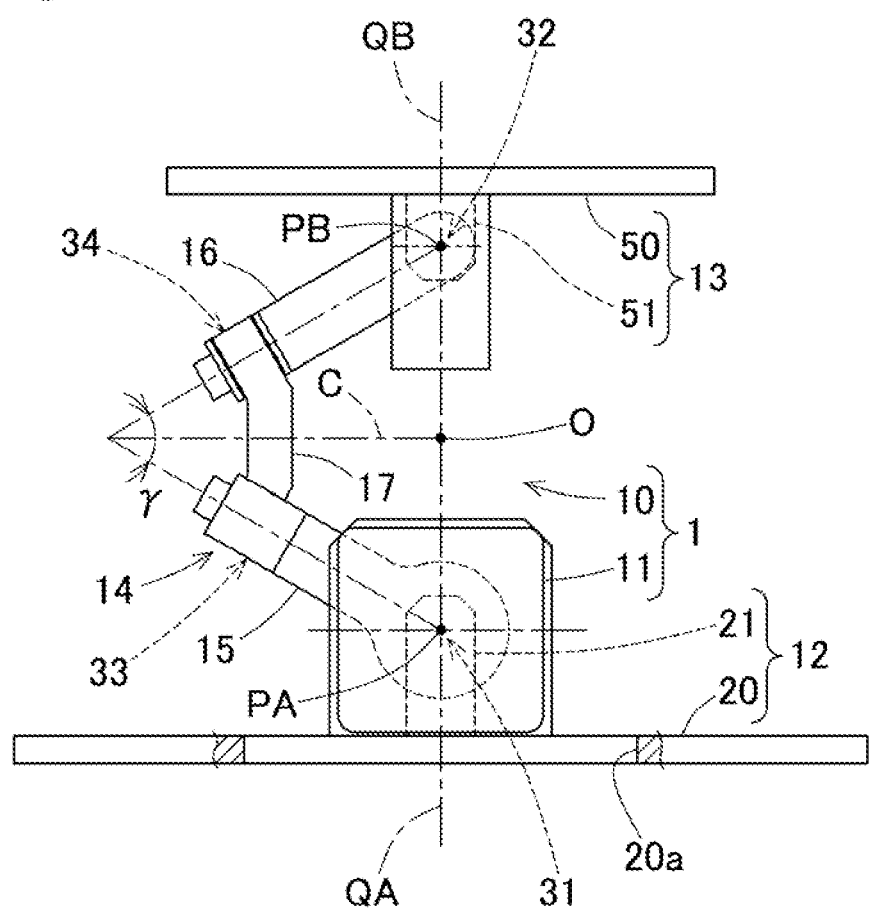
FIG. 5 is a front view showing a part of the link actuation apparatus body.

FIG. 5 shows one of the link mechanisms 14. As shown in FIG. 5, the link mechanism 14 includes: a proximal-side end link member 15; a distal-side end link member 16; and an intermediate link member 17 and forms a quadric-chain link mechanism having four revolute pair parts 31 to 34. Each of the proximal-side and distal-side end link members 15, 16 has an L shape. The proximal-side end link member 15 has one end rotatably coupled to the proximal-side link hub 12, and the distal-side end link member 16 has one end rotatably coupled to the distal-side link hub 13. The intermediate link member 17 has opposite ends rotatably coupled to the other ends of the proximal-side and distal-side end link members 15, 16.

The parallel link mechanism 10 has a structure in which two spherical link mechanisms are combined. In this structure, the center axis O1 of each revolute pair part 31 between the proximal-side link hub 12 and the proximal-side end link member 15 intersects with the center axis O2 of each revolute pair part 33 between the proximal-side end link member 15 and the intermediate link member 17 at a spherical link center PA, (FIG. 5). Similarly, the center axis O1 of each revolute pair part 32 between the distal-side link hub 13 and the distal-side end link member 16 intersects with the center axis O2 of each revolute pair part 34 between the distal-side end link member 16 and the intermediate link member 17 at a distal-side spherical link center PB (FIG. 5).

There is a same distance from each revolute pair part 31 between the proximal-side link hub 12 and the proximal-side end link member 15 to the spherical link center PA and from each revolute pair part 32 between the distal-side link hub 13 and the distal-side end link member 16 to the spherical link center PB. Similarly, there is also a same distance from each revolute pair 33 of the proximal-side end link member 15 and the intermediate link member 17 to the spherical link center PA and from each revolute pair 34 between the distal-side end link member 16 and the intermediate link member 17 to the spherical link center PB. The center axes of the respective revolute pair parts 33, 34 between the end link members 15, 16 and the intermediate link members 17 may have an intersection angle γ or may be parallel to each other.

Figure 6:
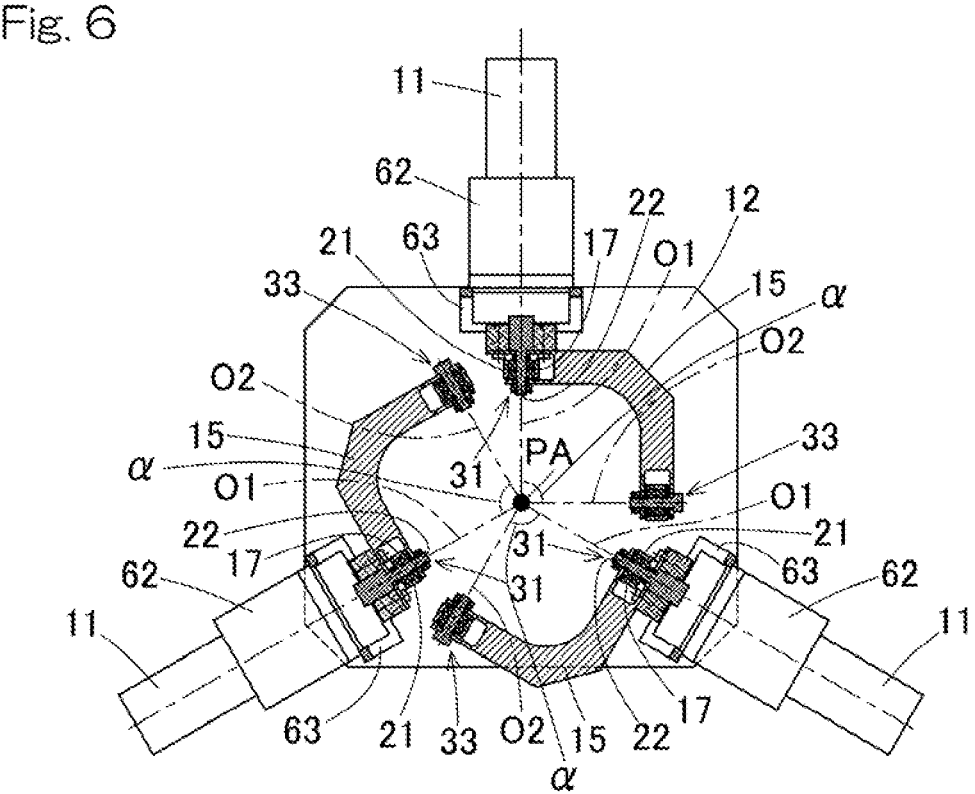
FIG. 6 is a cutaway plan view of the link actuation apparatus body.

FIG. 6 is a cutaway plan view of the link actuation apparatus. FIG. 6 shows a relationship among the center axis O1 of each revolute pair part 31 between the proximal-side link hub 12 and the proximal-side end link member 15, the center axis O2 of each revolute pair part 33 between the intermediate link member 17 and the proximal-side end link member 15, and the spherical link center PA on the proximal side. That is, the point of intersection of the center axis O1 and the center axis O2 corresponds to the spherical link center PA. Although, in FIG. 6, an angle α of 90° is defined by the center axis O1 of each revolute pair part 31 (32) between the link hub 12 (13) and the end link member 15 (16) and the center axis O2 of each revolute pair part 33 (34) between the end link member 15 (16) and the intermediate link member 17, the angle α may not necessarily be 90°.

The three link mechanisms 14 have geometrically the same shape in any posture. The expression "geometrically the same shape" means that, as shown in FIG. 9, a geometric model that represents the respective link members 15, 16, 17 with straight lines, that is, a model that is expressed by the respective revolute pair parts 31 to 34 and the straight lines connecting these revolute pair parts 31 to 34, has such a shape that a proximal-side part and a distal-side part are symmetrical to each other with respect to a central part of the intermediate link member 17.

Figure 9:
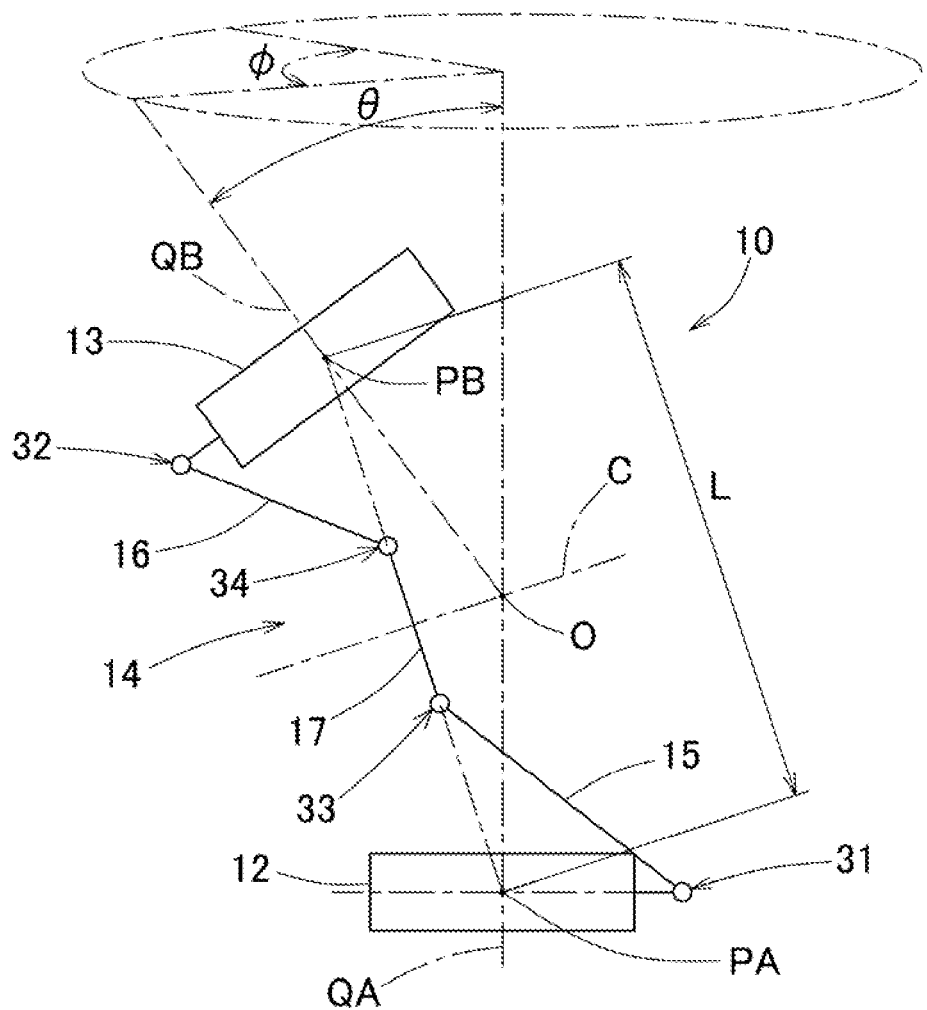
FIG. 9 is a model diagram showing a parallel link mechanism of the link actuation apparatus body with straight lines.

FIG. 9 illustrates one link mechanism 14 with straight lines. The parallel link mechanism 10 of this embodiment is of a rotationally symmetrical type. That is, the positional relationship of a proximal side region composed of the proximal-side link hub 12 and the proximal-side end link member 15 relative to a distal side region composed of the distal-side link hub 13 and the distal-side end link member 16 is rotationally symmetrical with respect to the center line C of the intermediate link member 17. The central parts of the respective intermediate link members 17 are located on a common orbital circle.

The proximal-side link hub 12, the distal-side link hub 13, and the three link mechanisms 14 cooperate together to form a mechanism having two degrees of freedom that allows the distal-side link hub 13 to rotatably move relative to the proximal-side link hub 12 about two orthogonal axes. In other words, the posture of the distal-side link hub 13 can be changed relative to the proximal-side link hub 12 with two degrees of freedom of rotation. This mechanism having two degrees of freedom makes it possible to achieve a compact configuration and to provide a wide operating range in which the distal-side link hub 13 can be moved relative to the proximal-side link hub 12.

For example, a center axis QA of the link hub 12 may refer to a line that passes through the spherical link center PA and orthogonally intersects with the center axis O1 (FIG. 6) of each revolute pair part 31 between the link hub 12 and the end link member 15. Similarly, a center axis QB of the link hub 13 may refer to a line that passes through the spherical link center PB and orthogonally intersects with the center axis O1 (FIG. 6) of each revolute pair part 32 between the link hub 13 and the end link member 16. In this case, a bend angle θ between the center axis QA of the proximal-side link hub 12 and the center axis QB of the distal-side link hub 13 may have a maximum value of about ±90°. A turn angle φ of the distal-side link hub 13 with respect to the proximal-side link hub 12 may be set in a range from 0° to 360°. The bend angle θ is a vertical angle at which the center axis QB of the distal-side link hub 13 is tilted with respect to the center axis QA of the proximal-side link hub 12. The turn angle φ is a horizontal angle at which the center axis QB of the distal-side link hub 13 is tilted with respect to the center axis QA of the proximal-side link hub 12.

Figure 1:
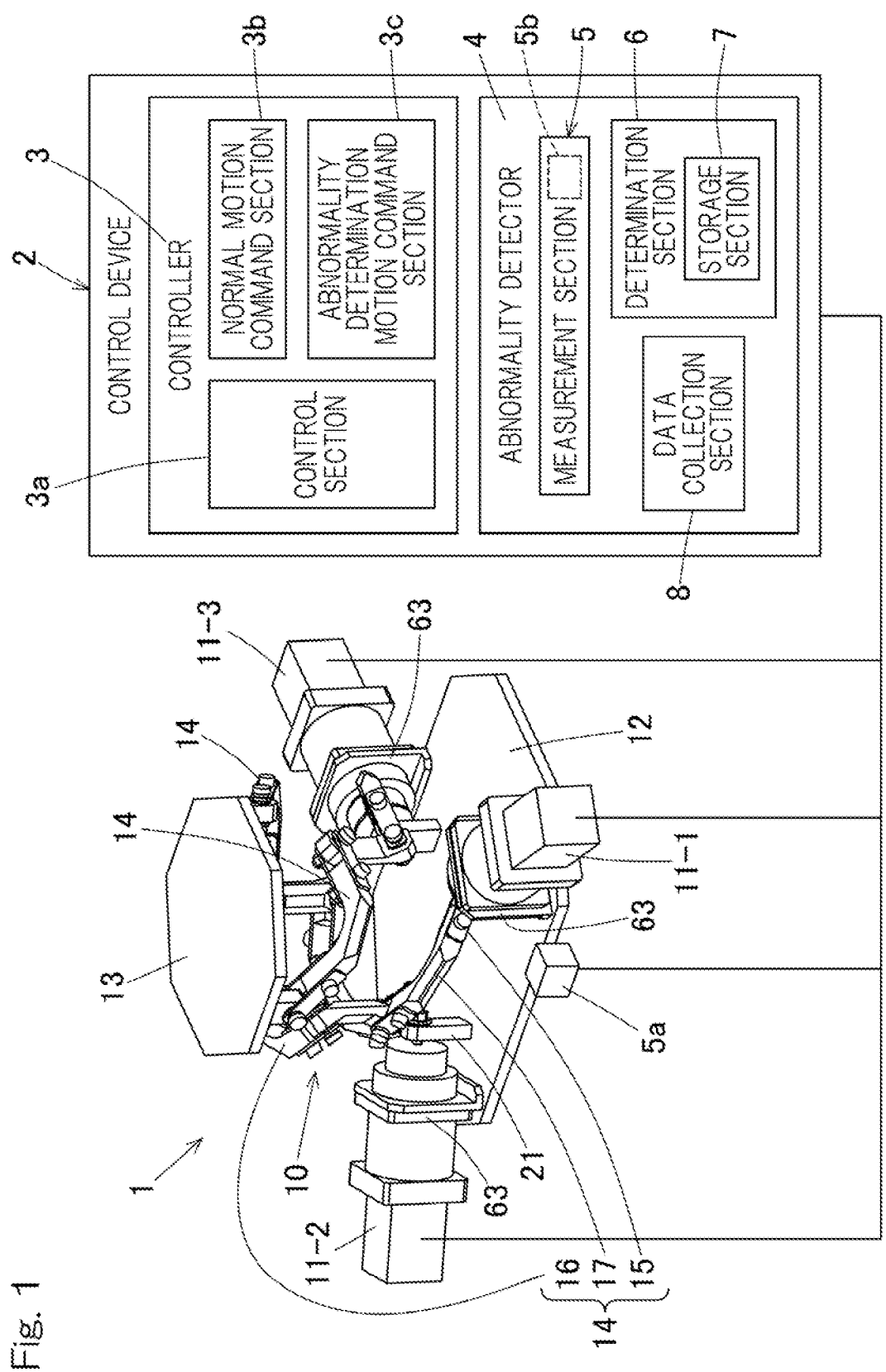
FIG. 1 shows a perspective view of a link actuation apparatus body of a link actuation apparatus according to a first embodiment of the present invention in combination with a block diagram of a control device.
Figure 2:
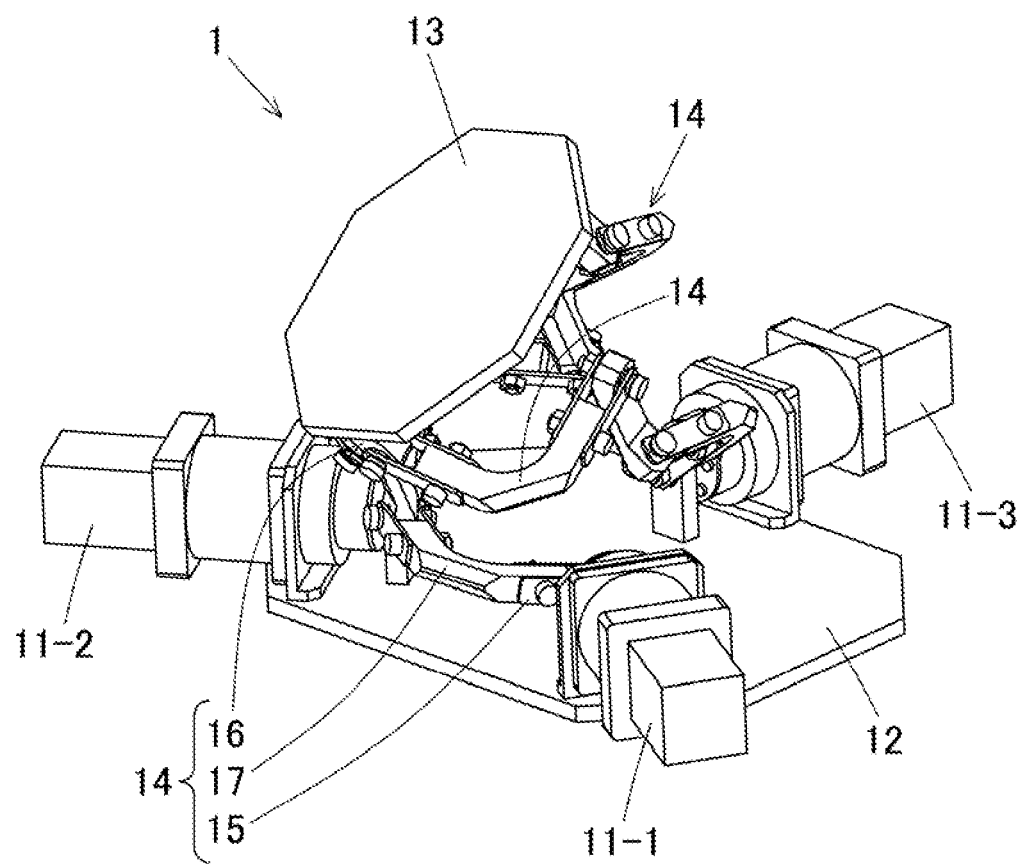
FIG. 2 is a perspective view of the link actuation apparatus body having a posture different from that of FIG. 1.

The posture of the distal-side link hub 13 relative to the proximal-side link hub 12 is changed in such a manner that a rotation center is located at an intersection O of the center axis QA of the proximal-side link hub 12 and the center axis QB of the distal-side link hub 13. In a state at an origin position where the center axis QA of the proximal-side link hub 12 and the center axis QB of the distal-side link hub 13 are on the same line (FIG. 3), the distal-side link hub 13 faces directly downward. FIG. 1 and FIG. 3 show a state where the center axis QB of the distal-side link hub 13 makes a certain operation angle with respect to the center axis QA of the proximal-side link hub 12. Even where the posture is changed, the distance L (FIG. 9) between the spherical link centers PA, PB on the proximal side and the distal side does not change.

Where each of the link mechanisms 14 satisfies the following conditions 1 to 5, the proximal side region composed of the proximal-side link hub 12 and the proximal-side end link member 15 move in the same manner as the distal side region composed of the distal-side link hub 13 and the distal-side end link member 16 because of the geometric symmetry. Therefore, the parallel link mechanism 10 functions as a constant velocity universal joint that makes the same rotation angle on the proximal side and the distal side and rotates at a constant velocity, when rotation is transmitted from the proximal side to the distal side.

Condition 1: The angles and the lengths of the central axes O1 of the revolute pair parts 31, 32 between the link hubs 12, 13 and the end link members 15, 16 in each link mechanism 14 are equal to each other.

Condition 2: The central axes O1 of the revolute pair parts 31, 32 between the link hubs 12, 13 and the end link members 15, 16 and the central axes O2 of the revolute pair parts 33, 34 between the end link members 15, 16 and the intermediate link members 17 intersect each other at the spherical link centers PA, PB on the proximal side and the distal side, respectively.

Condition 3: The geometrical shapes of the proximal-side end link member 15 and the distal-side end link member 16 are the same.

Condition 4: The geometrical shapes of the proximal-side portion and the distal-side portion of the intermediate link member 17 are the same.

Condition 5: The angular positional relationships between the intermediate link member 17 and the end link members 15, 16 with respect to the symmetry plane of the intermediate link member 17 are identical on the proximal side and the distal side.

As shown in FIG. 3, the proximal-side link hub 12 includes a proximal member 20 and three rotation support members 21 integrally provided with the proximal member 20. The three rotation support members 21 are disposed at equal intervals in a circumferential direction of the link hub 12. A rotation shaft 22 is rotatably coupled to each of the rotation support members 21, and the axis of the rotation shaft 22 intersects with the center axis QA of the proximal-side link hub 12. The rotation shaft 22 is coupled to one end of the proximal-side end link member 15.

The distal-side link hub 13 includes a plate-like distal member 50 and three rotation support members 51 provided to an inner surface of the distal member 50 at equal intervals in a circumferential direction of the link hub 13. A rotation shaft 52 is rotatably coupled to each of the rotation support members 51, and the axis of the rotation shaft 52 intersects with the center axis QB of the distal-side link hub 13. The rotation shaft 52 of the distal-side link hub 13 is coupled to one end of the distal-side end link member 16. The other end of the distal-side end link member 16 is coupled to a rotation shaft 55 which is rotatably coupled to the other end of the intermediate link member 17. The rotation shaft 52 of the distal-side link hub 13 and the rotation shaft 55 of the intermediate link member 17 also have the same shape as that of the rotation shaft 35 and are rotatably coupled to the other end of the rotation support member 51 and to the other end of the intermediate link member 17, respectively, through two bearings (not illustrated).

Revolute Pair Part 31 (Between Proximal-Side Link Hub 12 and Proximal-Side End Link Member 15)

Figure 7:
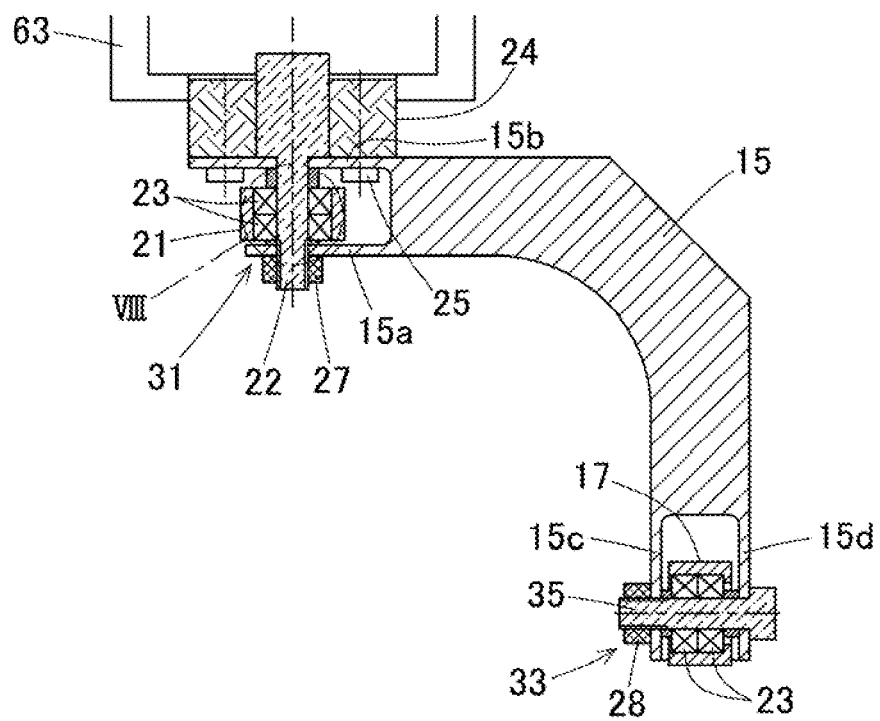
FIG. 7 is an enlarged sectional view showing a part of FIG. 6 in an enlarged manner.
Figure 8:
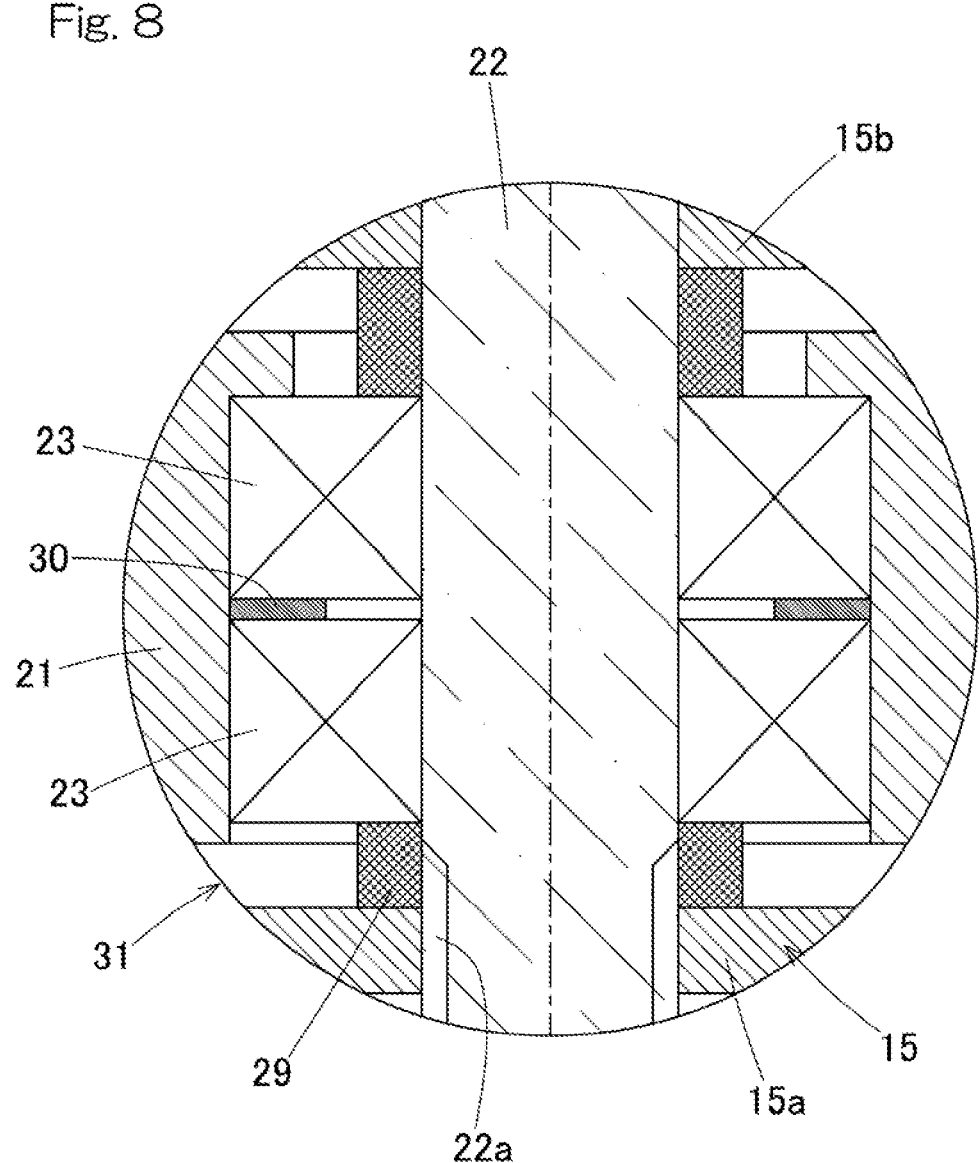
FIG. 8 is an enlarged cutaway plan view showing a part denoted by VIII in FIG. 7 in a further enlarged manner.

FIG. 6 shows a relation among the proximal-side end link members 15 illustrated as a cross section, the respective posture control drive sources 11, and the proximal-side link hub 12. FIG. 7 shows an enlarged sectional view of a part of FIG. 6, and FIG. 8 shows a further enlarged sectional view of a part of FIG. 7.

The proximal-side link hub 12 includes the three rotation shaft support members 21 for supporting the proximal-side end link members 15, the rotation shaft support members 21 protruding on an upper surface of the proximal member 20. Each rotation shaft support member 21 rotatably supports the rotation shaft 22 through two bearings 23, 23 arranged in two rows as shown in FIG. 7 and FIG. 8, and one end of the corresponding proximal-side end link member 15 is fixed to the rotation shaft 22. The connecting part between the proximal-side link hub 12 and the proximal-side end link member 15 via the bearings 23, 23 constitutes one revolute pair part 31.

Specifically, the proximal-side end link member 15 has one end having a pair of branched pieces 15a, 15b of a bifurcated shape, and the rotation shaft support member 21 and the bearings 23, 23 are interposed between these branched pieces 15a, 15b. An outer peripheral fitting member 24 is fittedly fixed to an outer periphery of a large diameter part of the rotation shaft 22, such that an end face of the outer peripheral fitting member 24 is in contact with an outer surface of one branched piece 15b. Then, a fixing member 25 such as a bolt is inserted from the inside to fix the branched piece 15b to the outer peripheral fitting member 24.

The bearings 23, 23 are rolling bearings such as angular ball bearings. A shim 30 (see FIG. 8) is interposed between outer rings (not illustrated) of the bearings 23, 23. A thin shaft part of the rotation shaft 22 is inserted through inner rings (not illustrated) of the bearings 23, 23, and ring-shaped spacers 29, 29 are inserted between the inner rings and the branched pieces 15a, 15b. Then, a nut 27 (see FIG. 7) is screwed onto a male thread part 22a at a tip of the thin shaft part to fasten the branched pieces 15a, 15b, the inner rings of the bearings 23, 23, and the spacers 29, 29 so as to apply a preload to the bearings 23, 23.

In FIG. 3, the revolute pair part 32 that is a connecting part between the distal-side end link hub 13 and the distal-side end link member 16 has a similar constitution to that of the revolute pair part 31 between the proximal-side link hub 12 and the proximal-side end link member 15 as described above.

Revolute Pair Part 33 (Between Proximal-Side End Link Member 15 and Intermediate Link Member 17)

As shown in FIG. 7, the proximal-side end link member 15 has the other end having a pair of branched pieces 15c, 15d of a bifurcated shape, and an end portion of the intermediate link member 17 is interposed between these branched pieces 15c, 15d. Bearings 23, 23, which are rolling bearings such as angular ball bearings, are arranged in two rows at the end portion of the intermediate link member 17 in a similar manner as that in the revolute pair part 31 between the proximal-side link hub 12 and the proximal-side end link member 15.

Outer rings of these bearings 23 are fittedly fixed to the intermediate link member 17, and the rotation shaft 35 is fitted into the inner rings. Similarly to the connection to the proximal-side link hub 12, a shim is interposed between the outer rings of the bearings 23, 23. Spacers are disposed in contact with the inner rings on the opposite sides of the rows of the bearings 23, 23. The rotation shaft 35 is a bolt having a male thread part and a head. A nut 28 is screwed onto the male thread part to fasten the pair of branched pieces 15c, 15d along with the two bearings 23, 23, the shim and the spacers, so as to apply a preload to the bearings 23, 23. Note that although the rotation shaft 35 of this part is a shaft for supporting rotation and is not configured to rotate, the shaft may be configured to rotate.

The revolute pair part 34 between the distal-side end link member 16 (see FIG. 3) and the intermediate link member 17 has a similar constitution to that of the revolute pair part 33 between the proximal-side end link member 15 and the intermediate link member 17, which has been described with reference to FIG. 7.

Posture Control Drive Source 11

As shown in FIG. 3, each of the posture control drive sources 11 is a rotary actuator having a speed reduction mechanism 62 and is disposed on a lower surface of the proximal member 20 of the proximal-side link hub 12 so as to be coaxial with the rotation shaft 22. The posture control drive source 11 and the speed reduction mechanism 62 are integrally provided, and the speed reduction mechanism 62 is fixed to the proximal member 20 by a drive source fixing member 63. In this example, each of the three link mechanisms 14 is provided with the posture control drive source 11. However, as long as at least two of the three link mechanisms 14 are provided with the posture control drive sources 11, the posture of the distal-side link hub 13 relative to the proximal-side link hub 12 can be defined.

The parallel link mechanism 10 rotationally drives the respective posture control drive sources 11 to change the posture. Specifically, when the posture control drive sources 11 are rotationally driven, the rotation is transmitted to the rotation shafts 22, with the speed of the rotation reduced by the speed reduction mechanisms 62. This changes the angle of the proximal-side end link member 15 relative to the proximal-side link hub 12 and thereby changes the posture of the distal-side link hub 3 relative to the proximal-side link hub 2.

End Effector (not Illustrated)

In FIG. 1, the distal-side link hub 12 is provided with an end effector (not illustrated) for performing a work on a work target (not illustrated), and the link actuation apparatus and the end effector constitute a work apparatus. Examples of the end effector may include an application nozzle, an air nozzle, a welding torch, a camera, and a clamping mechanism.

Control Device 2 (FIG. 1)

The control device 2 is configured to mainly control the posture control drive sources 11 (11-1 to 11-3) to control the posture of the parallel link mechanism 1. Examples of the control device 2 may include a computer, a program executed thereon, and an electronic circuit. The control device 2 includes: a controller 3 configured to control the posture; and an abnormality detector 4 configured to detect abnormality.

Controller 3

The controller 3 includes: a control section 3a configured to decode and execute a control program; a normal motion command section 3b; and an abnormality determination motion command section 3c. The normal motion command section 3b includes a control program for causing the link actuation apparatus body 1 to perform posture control for a work or the like. The abnormality determination motion command section 3c includes a control program for causing the link actuation apparatus body 1 to perform posture control for abnormality detection.

Abnormality Detector 4

The abnormality detector 4 is operable to detect abnormality in the revolute pair parts 31 to 34 of the link actuation apparatus body 1 and includes a measurement section 5 and a determination section 6. Examples of abnormality may include improper arrangement or wear of the bearings 23, the peripheral shims 30 and spacers 29. In this example, the abnormality detector 4 further includes a data collection section 8.

The measurement section 5 is operable to measure a certain state value that is affected by abnormality in the bearings 23 of the revolute pair parts 31 to 34 of the link actuation apparatus body 1. For example, the state value may be rigidity of the link actuation apparatus body 1. The determination section 6 determines if the link actuation apparatus body 1 has abnormality in any of the revolute pair parts 31 to 34 on the basis of a measurement result obtained by the measurement section 5. The determination section 6 determines the abnormality according to a predetermined rule on the basis of a measurement value obtained by the measurement section 5.

Measurement Section 5

In this embodiment, the measurement section 5 measures a natural frequency of the link actuation apparatus body 1 and estimates the rigidity of the link actuation apparatus body 1 on the basis of the natural frequency. Specifically, the measurement section 5 includes: a sensor 5a disposed on the proximal-side link hub 12 of the link actuation apparatus body 1; and a rigidity estimator 5b installed in a computer constituting the control device 2. For example, the sensor 5a may be a vibrograph such as an acceleration pickup.

Instead, the measurement section 5 may measure torque of the posture control drive sources 11 and estimate the rigidity of the link actuation apparatus body 1 on the basis of the measured torque. In this case, for example, an ammeter (not illustrated) for detecting a current flowing to the posture control drive sources 11 may be used for measuring torque, and the rigidity estimator 5b estimates the rigidity of the link actuation apparatus body 1 on the basis of the detected current.

Determination Section 6, Storage Section 7, Data Collection Section 8

The determination section 6 stores a state value, that serves as a reference for determination (for example, reference rigidity), as a reference value in a storage section 7 and compares a state value measured by the measurement section 5 to the reference value to perform the determination of abnormality. In this case, the storage section 7 stores reference values of the link actuation apparatus body 1 in a plurality of postures.

The reference values stored in the storage section 7 may be values determined by design or simulation, or state values such as the rigidity or frequency or the like of the link actuation apparatus body 1, which are obtained when the respective revolute pair parts 31 to 34 of the link actuation apparatus body 1 are in a normal state. The data collection section 8 causes the storage section 7 to store the state values of the link actuation apparatus body 1 in a plurality of postures, which are obtained when the respective revolute pair parts 31 to 34 of the link actuation apparatus body 1 are in a normal state.

The abnormality determination motion command section 3c gives a command for driving the posture control drive sources 11 such that the link actuation apparatus body 1 assumes a predetermined posture for abnormality determination. As described above, the abnormality determination motion command section 3c includes a control program to be executed by the control section 3a.

Motion of Link Actuation Apparatus Body 1

The link actuation apparatus body 1 of the present embodiment is constituted by the parallel link mechanism 10 having two degrees of freedom of rotation. The mechanism is characterized in that the rigidity of the respective link mechanisms 14 and of the link actuation apparatus body 1 varies depending on the posture of the parallel link mechanism 10. Where abnormality occurs in the parallel link mechanism 10 of the link actuation apparatus body 1, the rigidity (or "resistance") of the respective link mechanisms 14 and/or the rigidity of the respective revolute pair parts 31 to 34 vary. Change in the rigidity of the respective link mechanisms 14 and/or the rigidity of the respective revolute pair parts 31 to 34 causes a change in the natural vibration of the link actuation apparatus body 1 and/or in the torque of the respective posture control drive sources 11.

Motion for Abnormality Determination

As described above, the control device 2 includes the abnormality detector 4 for detecting abnormality in the link actuation apparatus body 1. The abnormality detector 4 includes: the measurement section 5 for measuring the rigidity of the link actuation apparatus body 1; and the determination section 6 for determining whether a value of the rigidity is normal or abnormal.

In the determination, since the determination section 6 includes the storage section 7 storing the state values of natural vibration or torque during normal time as reference values, it is possible to compare measurement values in various postures to the data (reference values) of the storage section 7 so as to detect abnormality. The rigidity of the link actuation apparatus body 1 can be estimated on the basis of the natural frequency or the torque of the posture control drive source 11. For example, as the rigidity increases, the amplitude and frequency of the natural vibration increase, and the driving torque also increases. For this reason, the rigidity of the link actuation apparatus body 1 can be estimated by measuring the natural vibration using the sensor 5a (such as an acceleration pickup) for detecting vibration, which is attached to the link actuation apparatus body 1, or by measuring the natural vibration or torque on the basis of a motor driving current of the posture control drive sources 11.

Although, in FIG. 1, the sensor 5a is attached to the proximal-side link hub 12, it may be attached to the distal-side link hub 13 where the vibration is greater. Where the distal-side link hub 13 of the link actuation apparatus has a posture as shown in FIG. 3, the three link mechanisms 14 support a substantially equal amount of load. In contrast, where the posture of the distal-side link hub 13 is changed to a posture as shown in FIG. 4, the three link mechanisms 14 unequally support the load and moment of inertia, resulting in a change in the rigidity of the entire link actuation apparatus body 1. Therefore, it is necessary to store values of the rigidity in various postures beforehand.

The link actuation apparatus of the present embodiment stores normal data in various postures because the rigidity varies depending on the posture of the link actuation apparatus body 1. The term "data" as used herein means the reference values or values for obtaining the reference values, that is, the rigidity estimated from the natural vibration and torque. The normal data is derived from previous inspections or simulation models, and a threshold that serves as a reference value in abnormality determination is defined on the basis of the normal data and is stored in the storage section 7.

Figure 10:
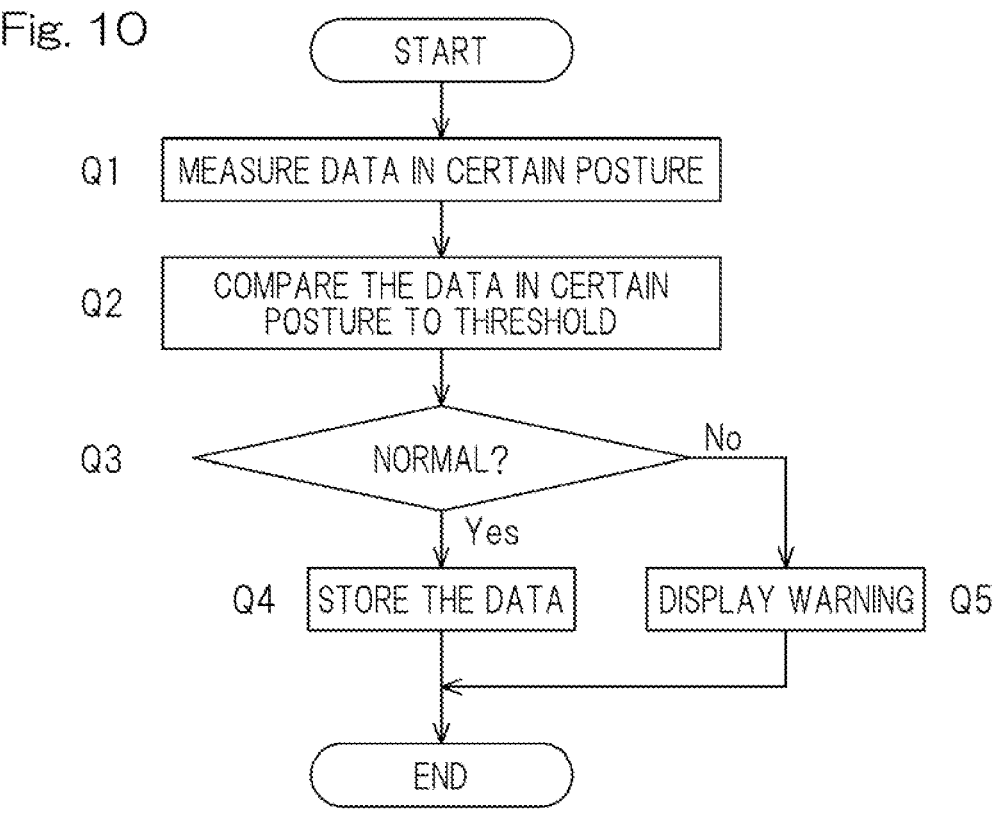
FIG. 10 is a flow diagram illustrating an example of abnormality detection in the link actuation apparatus.
Figure 11:
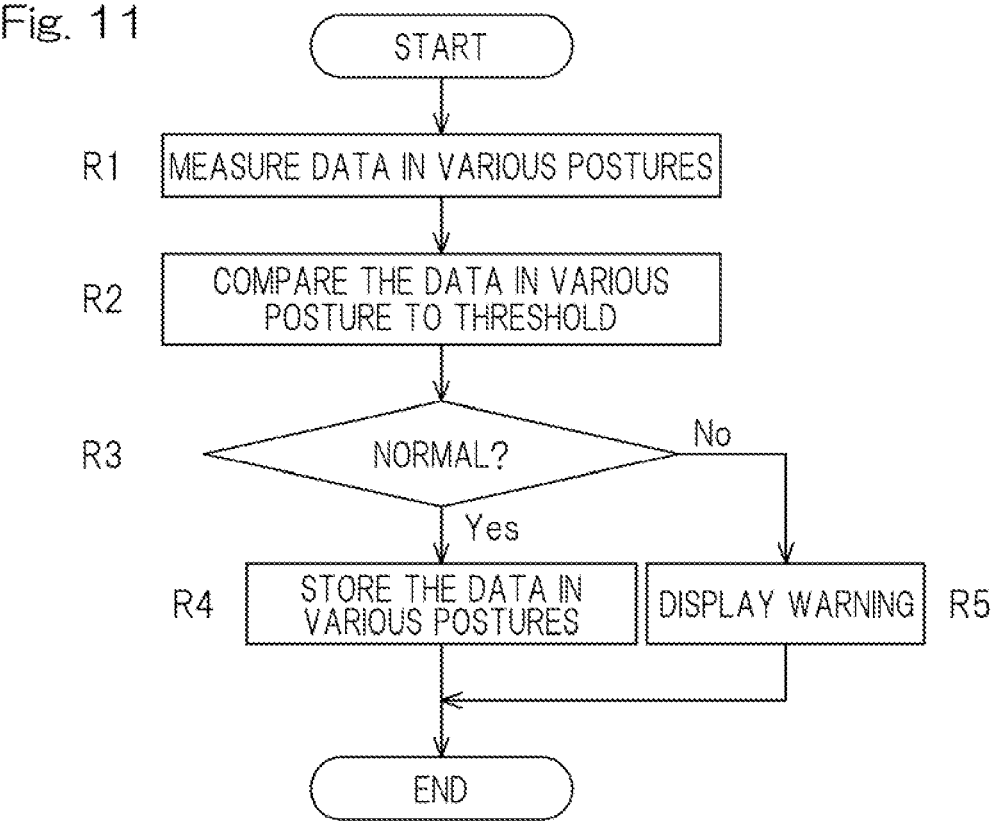
FIG. 11 is a flow diagram illustrating another example of abnormality detection in the link actuation apparatus.
Figure 12:
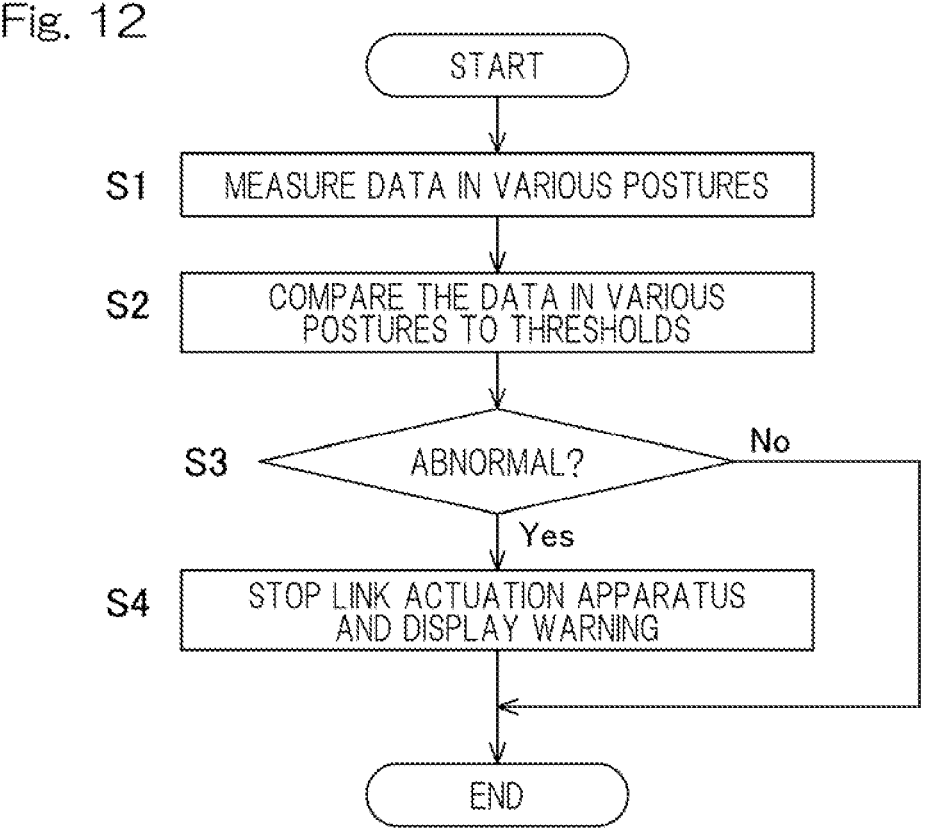
FIG. 12 is a flow diagram illustrating yet another example of abnormality detection in the link actuation apparatus.
Figure 13:
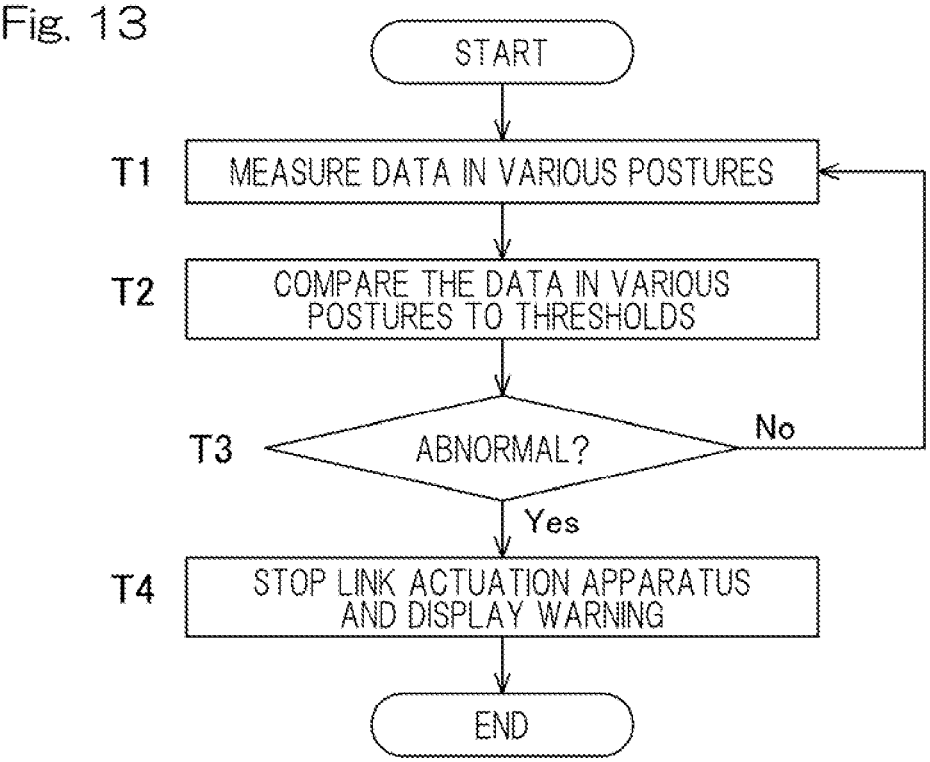
FIG. 13 is a flow diagram illustrating still another example of abnormality detection in the link actuation apparatus.

The abnormality detection by the abnormality detector 4 is carried out in an inspection process after assembly, during continuous operation which is normal operation, and in a check process before starting the continuous operation. FIG. 10 shows an exemplary flowchart of the inspection process after assembly; FIG. 11 shows another exemplary flowchart of the inspection process after assembly; FIG. 12 shows an exemplary flowchart of the check process before starting the continuous operation; and FIG. 13 shows another exemplary flowchart of an inspection during the continuous operation.

Inspection Process after Assembly (Flowchart of FIG. 10)

In the inspection process after assembly of the link actuation apparatus, the measurement section 5 measures data of a state value of the link actuation apparatus body 1 in a certain posture (step Q1). The determination section 6 compares the data to a threshold stored in the storage section 7 (step Q2). Where it is determined as normal as a result of the comparison (step Q3: Yes), the data collection section 8 of the abnormality detector 4 stores, in the storage section 7, the data measured in the certain posture (step Q4). The stored data will be used as normal data in subsequent inspections performed in the inspection process after assembly and will also be used as data specific to the link actuation apparatus in abnormality determination during continuous operation.

Where the determination section 6 determines that there is abnormality (step Q3: No), a warning is displayed to show a determination result indicating that there is abnormality (step Q5). This is displayed on a liquid crystal display device (not illustrated) provided to the control device 2. Where a warning is given, a product (not illustrated) handled by an operator or provided in a target body combined with the link actuation apparatus is subjected to reinspection or component replacement or is discarded as an unacceptable product (defective product).

Inspection Process After Assembly (Flowchart of FIG. 11)

Although the series of the inspection process after assembly of FIG. 10 repeats the data measurement and determination of normality/abnormality in a single posture, it is also possible, as in the example of FIG. 11, to measure the data in various postures in advance (step R1) and then to collectively perform the determination of normality/abnormality (steps R2, R3). In such a case, the data obtained in various postures is stored collectively (step R4), and the warnings are also displayed collectively (step R5).

Abnormality Determination in Check Process Before Continuous Operation (Flowchart of FIG. 12)

Before the link actuation apparatus performs continuous operation, which is normal operation, the abnormality determination motion command section 3c gives a command for causing the link actuation apparatus to perform a motion for carrying out the check process for the abnormality determination. The motion in the check process may be the same as the motion during the continuous operation or a dedicated motion for the check.

In the check process, the measurement section 6 measures the data in various postures during the motion at regular intervals of time or in each certain motion step (step S1) and compares the measured data to a threshold derived from the data stored in the storage section 7 during the inspection process (step S2). Where it is determined as normal as a result of the comparison (step S3: Yes), the link actuation apparatus is stopped, and a warning is displayed (step S4). The measurement in various postures (step S1) may be carried out every time a predetermined posture is assumed, instead of being carried out at regular intervals of time. Different thresholds may be used for the inspection after assembly, the check process, and the inspection during the continuous operation. The normal data may be used both as the accumulated normal data and the initial data specific to the link actuation apparatus.

Abnormality Determination During Continuous Operation (Flowchart of FIG. 13)

During continuous operation, the measurement section 6 measures the data in various postures at regular intervals of time or in each certain motion step (step T1) and compares the measured data to a threshold derived from the data stored in the storage section 7 during the inspection process (step T2), as in the same manner as that of the check process. Where it is determined as abnormal as a result of the comparison (step T3: Yes), the link actuation apparatus is stopped, and a warning is displayed (step T4).

For example, the expression "at regular intervals of time" may mean every hour. The expression "in each certain motion step" may mean every step or every multiple motion steps. The "motion step(s)" as used herein means a motion that is a unit of posture change of the link actuation apparatus.

Figure 14:
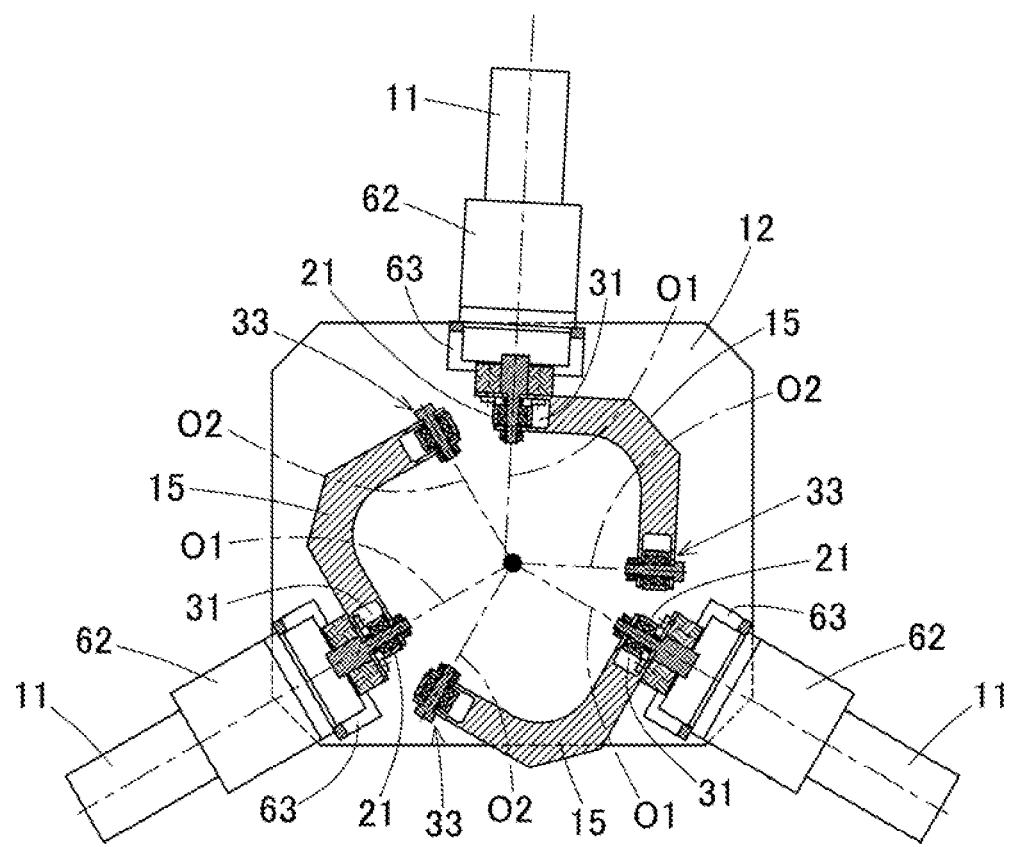
FIG. 14 is a cutaway plan view showing an example of improper assembly of the link actuation apparatus body.

Specific Example of Improper Assembly (FIG. 14)

FIG. 14 shows the above embodiment with improper assembly in which drive source fixing members 63 and the rotation support members 21 are attached at displaced angles. Normally, the link actuation apparatus of the present embodiment is assembled such that all of the center axes O1 of the revolute pair parts 31 between the proximal-side end link members 15 and the rotation support members 21 intersect with all of the center axes O2 of the revolute pair parts 33 between the proximal-side end link members 15 and the intermediate link members 17 at the center of the proximal-side link hub 12, as shown in FIG. 6.

In the example of improper assembly as shown in FIG. 14, the drive source fixing members 63 and the rotation support members 21 are attached at displaced angles, and as a result, the respective center axes O1 of the revolute pair parts 31 between the proximal-side end link members 15 and the rotation support members 21 do not intersect with the respective center axes O2 of the revolute pair parts 33 between the proximal-side end link members 15 and the intermediate link members 17 at the center of the proximal-side link hub 12.

If, in the state of FIG. 14, an attempt is made to control the posture control drive sources 11 in order to control the posture of the distal-side link hub 13, they do not operate normally due to the displacement of the mechanisms. For this reason, the link actuation apparatus has different natural vibration, and the posture control drive sources 11 have different torque, as compared with those in a normal state. By measuring the natural vibration or torque, the improper assembly can be detected.

The link actuation apparatus shown in the present embodiment is provided with the bearings 23 in each of the revolute pair parts 31 to 34 as rotation torque reducers. The bearing 23 are arranged in two rows, and a shim 30 is interposed between the outer rings of the bearings in order to increase the distance between the outer rings as shown in FIG. 8. A preload is applied to the inner rings of the bearings 23 by bolts and nuts through the proximal-side end link member 15 and the spacers 29 so as to increase the rigidity.

In such a constitution, improper assembly may be performed when the bearings 23 are disposed on the intermediate link member 17, in such a way that a shim 30 is not placed between the bearings 23, 23, or more than two shims 30 are placed between the bearings 23, 23. Due to such improper arrangement of the shim(s) 30, a dimensional difference may occur, which may lead to deformation of the proximal-side end link member 15 due to undesired force applied thereto. Moreover, change in the rigidity of the revolute pair parts 31 to 34 or the like may cause deterioration of accuracy, reduction of service life, and vibration. Lack of the shim may lower the rigidity and thus lead to deterioration of accuracy and vibration, whereas inclusion of extra shims may cause reduction of service life due to increased surface pressure.

Conventionally, it has been difficult to check improper arrangement of shims after assembly of the link actuation apparatus. For example, visual inspection requires disassembly of the apparatus, which takes time or labor. Moreover, it is not possible to non-destructively disassemble the apparatus. By use of the natural frequency or torque as in the above embodiment, however, it is possible to detect such improper assembly in a non-destructive and easy manner.

According to the above embodiment, by detecting abnormality on the basis of the natural vibration of the link actuation apparatus and the torque of the posture control drive sources, it is possible to easily detect deterioration of the rigidity and positioning accuracy due to improper assembly of the link actuation apparatus and/or prolonged operation, without disassembling the apparatus and even with its operation continuing. Note that the abnormality detector 4 may be configured to use both the natural frequency and the torque to detect abnormality.

Although the preferred embodiments of the present invention have been described with reference to the drawings, the present invention is not limited to the embodiments described above, and various additions, modifications, or deletions may be made without departing from the scope of the invention. Accordingly, such variants are included within the scope of the present invention.

REFERENCE NUMERALS

1 . . . Link actuation apparatus body
2 . . . Control device
3 . . . Controller
3a . . . Control section
3b . . . Normal motion command section 3c . . . Abnormality determination motion command section
4 . . . Abnormality detector
5 . . . Measurement section
6 . . . Determination section
7 . . . Storage section
8 . . . Data collection section
10 . . . Parallel link mechanism
11, 11-1, 11-2, 11-3 . . . Posture control drive source
12 . . . Proximal-side link hub
13 . . . Distal-side link hub
14 . . . Link mechanism
15 . . . Proximal-side end link member
16 . . . Distal-side end link member
17 . . . Intermediate link member
23 . . . Bearing
29 . . . Spacer
30 . . . Shim
31 to 34 . . . Revolute pair part

What is claimed is:

1. A link actuation apparatus comprising:
a parallel link mechanism including a proximal-side link hub, a distal-side link hub, link mechanisms each coupling the distal-side link hub to the proximal-side link hub such that a posture of the distal-side link hub is changeable relative to the proximal-side link hub, and revolute pair parts which serve as connections in the link mechanisms;
posture control drive sources configured to arbitrarily change the posture of the distal-side link hub relative to the link mechanisms; and
a control device configured to control the posture control drive sources,
wherein the control device includes an abnormality detector to:
to measure rigidity of a link actuation apparatus body constituted by the parallel link mechanism and the posture control drive sources, which rigidity represents difficulty in changing the posture of the link actuation apparatus body; and
determine if the link actuation apparatus body has abnormality in any of the revolute pair parts based on rigidity obtained.

2. The link actuation apparatus as claimed in claim 1, wherein the abnormality detector is configured to measure a natural frequency of the link actuation apparatus body and estimate the rigidity based on the natural frequency.

3. The link actuation apparatus as claimed in claim 1, wherein the abnormality detector is configured to measure torque of the posture control drive sources and estimate the rigidity of the link actuation apparatus body based on the measured torque.

4. The link actuation apparatus as claimed in claim 1, wherein the abnormality detector includes:
a storage section configured to store state values of the link actuation apparatus body in a plurality of postures, which are obtained when respective revolute pair parts of the link actuation apparatus body are in a normal state, and
the abnormality detector is configured to compare a state value measured to the stored state values in the plurality of postures to determine the abnormality.

5. The link actuation apparatus as claimed in claim 1, wherein the control device includes an abnormality determination motion command configured to drive the posture control drive sources such that the link actuation apparatus body assumes a predetermined posture for abnormality determination.

* * * * *